United States Patent [19]

Austin et al.

[11] 4,171,981

[45] Oct. 23, 1979

[54] PROCESS FOR THE PRODUCTION OF HOT MELT COATING COMPOSITIONS CONTAINING MICROCAPSULES

[75] Inventors: Robert A. Austin, Chillicothe, Ohio; Dale R. Shackle, Scottsboro, Ala.

[73] Assignee: The Mead Corporation, Dayton, Ohio

[21] Appl. No.: 792,323

[22] Filed: Apr. 29, 1977

[51] Int. Cl.$^2$ .................. C09D 11/12; B41M 5/22
[52] U.S. Cl. .................. 106/14.5; 106/21; 106/31; 106/270; 282/27.5; 427/150; 427/151; 428/307; 428/488; 428/914
[58] Field of Search .................. 106/14.5, 21, 31, 270, 106/271, 272; 282/27.5; 427/144, 150–153, 261, 288, 398; 428/307, 323, 411, 484, 486, 488, 537, 913, 914

[56] References Cited

U.S. PATENT DOCUMENTS

| | | | |
|---|---|---|---|
| 3,016,308 | 1/1962 | Macaulay | 106/22 X |
| 3,079,351 | 2/1963 | Staneslow et al. | 428/914 X |
| 3,684,549 | 8/1972 | Shank | 428/476 |
| 4,063,754 | 12/1977 | Shackle et al. | 282/27.5 |

*Primary Examiner*—George F. Lesmes
*Assistant Examiner*—Bruce H. Hess

*Attorney, Agent, or Firm*—Charles N. Shane, Jr.; Stephen H. Cagle; Wilson G. Palmer

[57] ABSTRACT

A process for the production of a hot melt coating composition containing microcapsules. The process comprises the steps of preparing a dispersion of substantially discrete microcapsules in a volatile solvent continuous phase. A hot melt suspending medium is prepared, the hot melt suspending medium having a melting point of from about 50° C. to about 140° C. and a melting point range of less than about 15° C., the hot melt suspending medium being in a fluid state. The dispersion of substantially discrete microcapsules in a volatile solvent is then mixed with the fluid hot melt suspending medium with turbulent agitation to form an intimate mixture of the dispersion of microcapsules and the hot melt suspending medium. Heat and a vacuum are applied to the mixture, while maintaining the agitation, until the volatile solvent is substantially removed from the mixture to form a dispersion of substantially discrete microcapsules in the liquid hot melt suspending medium. The heat is applied at a rate sufficient to maintain the mixture at a temperature above the melting point of the hot melt suspending medium, the temperature also being above the boiling point of water at the vacuum level.

16 Claims, No Drawings

PROCESS FOR THE PRODUCTION OF HOT MELT COATING COMPOSITIONS CONTAINING MICROCAPSULES

BACKGROUND OF THE INVENTION

1. Field of the Invention

This invention relates to the production of coating compositions comprising a hot melt suspending medium and having capsular material dispersed therein. In particular, it is concerned with a process of making hot melt coating compositions containing microcapsules starting with volatile solvent microcapsular dispersions. The hot melt coating compositions so produced are particularly useful, for example, for the production of pressure-sensitive carbonless copy papers.

Prior Art

Carbonless copy paper, briefly stated, is a standard type of paper wherein during manufacture the backside of a paper substrate is coated with what is referred to as a CB coating, the CB coating containing one or more color precursors generally in capsular, and more preferably microcapsular, form. At the same time, the front side of the paper substrate is coated during manufacture with what is referred to as a CF coating which contains one or more color developers. Both the color precursor and the color developer remain in the coating compositions on the respective back and front surfaces of the paper in colorless form. This is true until the CB and CF coatings are brought into abutting relationship and sufficient pressure, as by a typewriter, is applied to rupture the CB coating to release the color precursor. At this time the color precursor transfers to the CF coating and reacts with the color developer therein to form an image. Carbonless paper has proved to be an exceptionally valuable image transfer medium for a variety of reasons only one of which is the fact that until a CB coating is placed next to a CF coating both the CB and the CF are in an inactive state as the co-reactive elements are not in contact with one another. Patents relating to carbonless paper products are:

U.S. Pat. No. 2,712,507 (1955) to Green
U.S. Pat. No. 2,730,456 (1956) to Green et al
U.S. Pat. No. 3,455,721 (1969) to Phillips et al
U.S. Pat. No. 3,466,184 (1969) to Bowler et al
U.S. Pat. No. 3,672,935 (1972) to Miller et al A third generation product which is in an advanced stage of development and commercialization at this time and which is available in some business sectors is referred to as self-contained paper. Very generally stated self-contained paper refers to an imaging system wherein only one side of the paper needs to be coated and the one coating contains both the color precursor, generally in encapsulated form, and the color developer. Thus when pressure is applied, again as by a typewriter or other writing instrument, the color precursor capsule is ruptured and reacts with the surrounding color developer to form an image. Both the carbonless paper image transfer system and the self-contained system have been the subject of a great deal of patent activity. A typical autogeneous record material system, earlier sometimes referred to as "self-contained" because all elements for making a mark are in a single sheet, is disclosed in U.S. Pat. No. 2,730,457 (1956) to Green.

A disadvantage of coated paper products such as carbonless and self-contained stems from the necessity of applying a liquid coating composition containing the color forming ingredients during the manufacturing process. In the application of CB coatings, the coating composition generally comprises a dispersion of microcapsules in an aqueous medium containing also a binder for the microcapsules. This aqueous coating composition requires removal of the excess water by drying which drying entails the use of complex and expensive equipment and a high input of heat energy to continuously dry a substrate coated with an aqueous coating composition.

The application of heat not only is expensive, making the total product manufacturing operation less cost effective, but also is potentially damaging to the color forming ingredients which are generally coated onto the paper substrate during manufacture. High degrees of temperature in the drying step require specific formulation of wall-forming compounds which permit the use of excess heat. The problems encountered in the actual coating step are generally attributable to the necessity for a heated drying step following the coating operation.

Many of the particular advantages of the process of this invention are derived from the fact that a hot melt coating composition is produced which may be used to coat the paper substrate. This is in contrast to the coatings used by the prior art which have generally required an aqueous or organic solvent coating. For purposes of this application the term "100% solids coating" will sometimes be used to describe the coating operation and should be understood to refer to the fact that a hot melt coating composition is used and therefore the drying step usually present in the manufacture of paper and in coating has been eliminated.

The use of hot melt CB coatings is known having been disclosed, for example, in:

U.S. Pat. No. 3,016,308 (1962) to Macauley
U.S. Pat. No. 3,079,351 (1963) to Staneslow et al
U.S. Pat. No. 3,684,549 (1972) to Shank The use of hot melt CB coatings containing microcapsules is mentioned in Staneslow et al and the use of free flowing powders of discrete microcapsules in preparing hot melt CB coating compositions is disclosed in Macauley.

The above prior art processes of preparing the hot melt CB coating compositions have the disadvantage of requiring a separate step to produce a powder of microcapsules with accompanying difficulties of handling and storing the microcapsular powder without damaging the dry microcapsules. Additionally, the dry microcapsules have to be dispersed in the hot melt suspending medium.

The preparation of hot melt CB coating compositions containing microcapsules by the process of the instant invention involves the process of mixing together a hot melt suspending medium and a volatile solvent dispersion of microcapsules and applying heat and vacuum to the mixture to produce the finished coating composition. Furthermore, damage to the microcapsules in handling of the powder is substantially eliminated and in its preferred form, the process may be operated continuously. The use of heat in combination with vacuum permits the effective removal of water from the microcapsular material without requiring an excess of either. For purposes of this application the term volatile solvent shall be used to refer to aqueous and non-aqueous solvents and would include among many others water and organic solvents.

STATEMENT OF THE INVENTION

This invention relates to a process for the production of a hot melt coating composition containing microcapsules. The process comprises the steps of preparing a dispersion of substantially discrete microcapsules in a volatile solvent continuous phase. A hot melt suspending medium is prepared, the hot melt suspending medium having a melting point of from about 50° C. to about 140° C. and a melting point range of less than about 15° C., the hot melt suspending medium being in a fluid state. The dispersion of substantially discrete microcapsules in a volatile solvent is then mixed with the fluid hot melt suspending medium with turbulent agitation to form an intimate mixture of the dispersion of microcapsules and the hot melt suspending medium. Heat and a vacuum are applied to the mixture, while maintaining the agitation, until the volatile solvent is substantially removed from the mixture to form a dispersion of substantially discrete microcapsules in the liquid hot melt suspending medium. The heat is applied at a rate sufficient to maintain the mixture at a temperature above the melting point of the hot melt suspending medium, the temperature also being above the boiling point of water at the vacuum level. This invention further relates to the coating composition produced by the process of this invention.

DETAILED DESCRIPTION OF THE INVENTION

The process of this invention involves the production of a hot melt coating composition containing microcapsules. In its broadest form the process is accomplished by mixing a microcapsular dispersion in a volatile solvent with a fluid hot melt suspending medium and applying a vacuum while maintaining mixing and a temperature high enough to keep the hot melt suspending medium in a liquid state and to evaporate the volatile solvent by heating until substantially all of the solvent is removed from the mixture. In the most preferred process and product of this invention the volatile solvent is water. For purposes of this application the term "fluid" as applied to a hot melt suspending medium will be used to describe a liquid or a pourable particulate powder.

As essential feature of the process of this invention is the condition under which the continuous volatile solvent phase of the dispersion of microcapsules is exchanged for the hot melt suspending medium as the continuous phase. This is accomplished by the application of heat and vacuum. The particular difficulty lies in the sensitivity of microcapsules to heat, particularly moist heat, and high shear conditions. In order for this exchange to be successful, it must take place without rupture or substantial deterioration of the microcapsules to the point where the microcapsules are functionally ineffective. We have found that by controlling the conditions of the exchange as follows, a dispersion of microcapsules in a hot melt suspending medium can be successfully produced.

1. The microcapsular dispersion in a volatile solvent is a dispersion of substantially discrete microcapsules.
2. The temperature throughout the mixing step is low enough to prevent substantial heat deterioration of the microcapsules during the mixing step.
3. The vacuum is high enough to substantially lower the boiling temperature yet not high enough to rupture the microcapsules.
4. The combined effect of the temperature and vacuum is evaporation of the volatile solvent and the temperature is maintained above the melting point of the hot melt suspending medium and also above the boiling point of the volatile solvent.
5. Mixing of the microcapsular dispersion in the volatile solvent and the liquid hot melt suspending medium is by low shear, turbulent agitation.

These conditions and their effect on the resultant microcapsular dispersions are explained in detail later in this description.

The coating compositions produced by the process of this invention are dispersions of substantially discrete microcapsules in a hot melt suspending medium. On applying the coating compositions of this invention to a substrate and allowing the composition to set by cooling, the hot melt suspending medium acts as a binder for the microcapsules to facilitate adherence of the microcapsules to the substrate. Microcapsules containing pharmaceutical agents, aromas, perfumes, flavoring agents, insecticides, dyes, pigments and color precursors may be dispersed in hot melt suspending medium by the process of this invention and coated on a variety of substrates including papers, fabrics and plastic films.

A preferred embodiment of this invention is the production of hot melt microcapsular coating compositions which may be used in the preparation of pressure-sensitive carbonless copy papers. The preparation of these carbonless copy papers is described in detail in a commonly assigned, co-pending application entitled, "Pressure-Sensitive Carbonless Transfer Sheets Using Novel Hot Melt Systems and Process for the Production Thereof", U.S. application Ser. No. 747,682 filed Dec. 6, 1976 which is incorporated herein by reference. The Process of this invention will hereinafter be described in detail with respect to this preferred embodiment.

In the preferred embodiment, the hot melt coating composition is essentially a dispersion of an encapsulated chromogenic material in a hot melt system. For purposes of this application, "chromogenic material" will refer to color precursors, color formers, color developers and the like. The encapsulated chromogenic material is usually an oil solution of one or more color precursors. The coating composition can contain, in addition to the encapsulated chromogenic material, fillers, stilt material such as Arrowroot starch granules and dispersing agents. The type and amount of such additional ingredients in the coating composition are strictly a matter of choice and are generally dependent on the desired final product.

Although any of the color precursors or color formers known in the prior art can be used, the color precursors most useful in the practice of the preferred embodiment of this invention are the color precursors of the electron-donating type. The preferred group of electron donating color precursors include the lactone phthalides, such as crystal violet lactone, and 3,3-bis-(1'-ethyl-2-methylindol-3"-yl) phthalide, the lactone fluorans, such as 2-dibenzylamino-6-diethylaminofluoran and 6-diethylamino-1,3-dimethylfluorans, the lactone xanthenes, the leucoauramines, the 2-(omega substituted vinylene)-3, 3-disubstituted-3-H-indoles and 1,3,3-trialkylindolinospirans. Mixtures of these color precursors can be used if desired. In the preferred process of this invention microencapsulated oil solutions of color precursors are used. The color precursors are preferably present in such oil solutions in an amount of from about 0.5% to about 20.0% based on the weight of the oil solution, and the most preferred range being from about 2% to about 7%.

In the practice of this invention the microcapsules are prepared in the form of a dispersion in a volatile solvent. In general, the more uniform the microcapsular dispersion the better the final product. As has been defined hereinabove, the volatile solvents useful in the practice of this invention include both aqueous and non-aqueous solvents. Of the non-aqueous solvents the most preferred are the organic solvents such as: benzene, xylene, toluene, mineral spirits, carbon tetrachloride, chloroform, methylene dichloride, cyclohexane, n-hexane, n-butylacetate and diethylether.

The hot melt suspending media generally useful in the practice of this invention include waxes and resins. A preferred group of compounds useful as hot melt suspending media include: deresinated, oxidized mineral waxes such as the montan waxes, amide waxes such as bisstearamide wax, stearamide wax, behenamide wax, fatty acid waxes, hydroxylated fatty acid waxes, hydroxystearate waxes, oxazoline waxes and mixtures thereof.

Another type of hot melt suspending media is a nonpolar hydrocarbon wax, such as Be Square 170/175 from Bareco Division of Petrolite Corporation which includes a small amount of a dispersing agent. The dispersing agent may, for instance, be sulfated castor oil, more commonly known as Turkey Red Oil.

A characteristic of the preferred hot melt suspending media useful in the practice of this invention is a melting point of from about 50° C. to about 140° C. A more preferred melting point for the waxes or resins useful in the practice of this invention is from about 70° C. to about 100° C. Also relative to the melting point, it is necessary for the coating composition of this invention to set rapidly after application to the particular substrate. More particularly, a practical melting range limitation, or in other words range of temperature in which the liquid hot melt composition sets into a solid composition, is from about 1.0° C. to about 15° C.

The hot melt waxes and resins of this invention preferably also have a low viscosity when in a molten state in order to facilitate ease of spreading on a substrate. In general, it is desirable that the hot melt suspending media having a viscosity of less than about 120 centipoises at a temperature of approximately 5° C. above the melting point of a particular hot melt suspending medium. In addition, it is preferred that the hot melt wax or hot melt suspending media of this invention have a light color in order to be compatible with the final paper or plastic product being produced. This means that it is preferred for the hot melt to be white or transparent after application to the particular substrate being coated.

The preferred waxes, resins and other hot melt suspending media of this invention preferrable are polar. By polar it is meant that the preferred waxes are characterized by a certain amount of polarity, the polar compositions being characterized by the presence of functional groups selected from the group consisting of: carboxyl, carbonyl, hydroxyl, ether, methoxy, ethoxy, ester, amide, amine, hetercyclic groups and combinations thereof.

Another group of compounds which are useful in the practice of this invention are the water soluble waxes and resins such as, for example, acetamide, acetanilide, trimethylol propane, hydantoin, urea, ammonium nitrate, benzene sulfonabide, poly(vinylpyrolidone) (GAF Corporation, New York, NY), polyethylene glycol waxes, Carbowax 4000 and 6000 (Union Carbide Corporation, New York, NY) and methoxy polyethylene glycol waxes, Carbowax 2000 and 5000. Of these compounds, the polyethylene glycols are preferred.

The dispersibility of any particular microcapsule system in any particular hot melt system is a function of the chemical compatability of the two systems. It has been shown that a subjective, yet reproduceable, numerical rating in "dispersion units" can be assigned to any microcapsular/hot melt system to evaluate its commercial potential. Applicant has devised several dispersion characteristics such as agglomeration, microcapsules per unit area and flowability of various microcapsular-hot melt activation systems. In evaluating these systems a numerical figure of from 0 to 10 is assigned to each system which represents dispersion units. The number 0 would represent a non-dispersed system wherein essentially a large agglomerated mass of microcapsules exist. At the other end of the subjective spectrum of dispersibility is a uniform dispersion of individual microcapsules in a hot continuous medium. While lower dispersion characteristics are acceptable for many products a high degree of dispersibility is essential for the effective production of carbonless paper.

It has been experimentally determined that a dispersion characteristic rating of from about 6 to about 10 is commercially acceptable while a rating of from about 8 to about 10 is preferred. A most preferred dispersion rating for use in carbonless paper systems would be from 9 to about 10. A rating of 9 to 10 is described herein as "a dispersion of substantially discrete microcapsules". As such this type of a dispersion may be satisfactory for products other than carbonless paper. However, poor dispersion characteristics in carbonless paper result in an unsatisfactory product which do not image properly and which suffer from feathering and from incomplete and irregular line and image formation. Thus, dispersibility is considered a key characteristic of any hot melt activation system including microcapsules. Dispersibility can be attained by several methods although use of extreme process conditions such as high-shear agitation or heat are generally not considered feasible in carbonless paper manufacture. The dispersion characteristics most preferred for carbonless paper are attained by using a hot melt activation system and microcapsular system which are chemically compatible to promote dispersibility.

An alternate but preferred embodiment of this invention includes the use of a dispersing agent with the waxes of this invention. In this embodiment, the dispersing agent is added to the aqueous dispersion of microcapsules prior to combining the microcapsules with the hot melt suspending medium. A preferred group of dispersing agents are the anionic dispersing agents, many of which are commercially available. A preferred group of anionic dispersing agents includes the sodium salts of condensed naphthalene sulfonic acid, the sodium salt of polymeric carboxylic acid, the free acids of complex organic phosphate esters, sulfated castor oil, poly-(methylvinyl ether/maleic anhydride) and combinations thereof. The dispersing agent is added to the microcapsules in an amount of from about 0.1% to about 10% based on the dry weight of the microcapsules. A preferred range of addition is from about 0.5% to about 5.0% based on the dry weight of the microcapsules while a most preferred range is from about 1.0% to about 3.0% based on the dry weight of the microcapsules.

In some instances the dispersing agent and the wall-forming material are one in the same and the wall-forming material not actually used in the microcapsule wall formation is present in hot melt coating dispersions as a dispersing agent. Although, as described above, many of the well-known, commercially available dispersing agents can be used in the process and product of this invention a group of secondary dispersing agents that may be present as excess wall forming material includes: hydroxypropylcellulose, gum arabic, gelatin, polyvinyl alcohol, a group of secondary dispersing agents that may be present as excess wall forming material includes: hydroxypropylcellulose, gum arabic, gelatin, polyvinyl alcohol, carboxymethylcellulose, and mixtures of the above.

The particular wall-forming materials or the particular encapsulated chromogenic material are not asserted to be an inventive feature herein. Rather, there are described in the patent literature various capsular chromogenic materials which may be used. Such chromogenic materials have been encapsulated in gelatin wall-forming materials (see U.S. Pat. Nos. 2,730,456 and 2,800,457) including gum arabic, polyvinyl alcohol, carboxymethylcellulose, resorcinolformaldehyde wall-formers (see U.S. Pat. No. 3,755,190), isocyanate wall-formers (see U.S. Pat. No. 3,914,511) isocyanate-polyol wall-formers (see U.S. Pat. No. 3,796,669) and hydroxypropylcellulose (see commonly assigned, co-pending application Ser. No. 480,956, filed June 19, 1975) in addition to mixtures of the above. Microencapsulation has been accomplished by a variety of known techniques including coacervation, interfacial polymerization, polymerization of one or more monomers in an oil, various melting dispersing and cooling methods. Compounds which have been found preferable for use as wall-forming materials in the various microencapsulation techniques included: hydroxypropylcellulose, methylcellulose, carboxymethylcellulose, gelatin, melamine-formaldehyde, polyfunctional isocyanates and prepolymers thereof, polyfunctional acid chlorides, polyamines, polyols, epoxides and mixtures thereof.

Particularly well-suited to use in the present invention are microcapsules of hydroxypropylcellulose (HPC) material and isocyanate-polyol materials. This is because such microcapsules can be dispersed in most hot melt media. In addition, the HPC and isocyanate-polyol capsules have good permeability, strength, and temperature characteristics.

In general, the microcapsules prepared as indicated above are in the form of an aqueous dispersion of the microcapsules although most can also be used in the form of a dispersion of microcapsules in a volatile organic solvent. In the prior art methods of making hot melt dispersions of microcapsules starting with aqueous dispersions of microcapsules, the microcapsules were removed from the aqueous medium by spray drying, filtering or drying at elevated temperatures. The dried microcapsules were then redispersed by mechanical means in a hot melt suspending medium.

Using the process of the instant invention, the conversion of the microcapsular dispersion in a volatile solvent to a dispersion of microcapsules in a hot melt suspending medium is accomplished in one exchange process step. The process may be either batch or continuous. In the batch process, the volatile solvent dispersion of microcapsules and the hot melt suspending medium, either in the forms of a finely ground powder or preferably as a melted liquid, can be mechanically mixed together in a closed environment, heated to a temperature above melting point of the suspending medium and a vacuum is applied to the closed environment. The temperature must also be above the boiling point of the volatile solvent at the particular vacuum used. In practice, such an environment can be conveniently produced in a closed vessel such as a resin kettle and in a variety of additional commercially available closed containers where the application of heat and vacuum can be controlled. In this apparatus, a mixture of the dispersion of microcapsules in a volatile solvent and the melted hot melt suspending medium can be introduced into the kettle batchwise and the heat and vacuum can be applied and maintained until substantially all of the solvent is removed from the system. Depending on the size of the batch and the rate of transfer of heat into the batch, this may take a matter of minutes to several hours. Turbulent mixing of the low shear type, such as by a rotating paddle, of the mixture in the kettle materially reduces the time of batch treatment and improves the dispersion of the microcapsules. For purposes of this application the term "low-shear" shall be understood to refer to the shear sufficient to perform satisfactory turbulent mixing without at the same time rupturing or otherwise causing substantial deterioration of the microcapsule. It should further be understood that the shear which can be used satisfactorily will vary depending among other things on the type of microcapsule used.

A preferred form of the process can be obtained using a thin film evaporator. Such evaporators are generally tubular in construction with the evaporating section of the tube being equipped with rotating wiper blades. The wiper blades may contact the cylindrical walls of the evaporator or there may be a slight gap in the order of several thousandths of an inch between the wiper blades and the wall. In either case, a thin film of the liquid to be treated is formed on the cylinder wall by the centrifugal action and wiping of the rotating blades. The rotating blades continuously agitate the thin film material being treated and keep it in a turbulent condition as it passes through the evaporating section. Treatment times are in the order of a few seconds. Heat necessary for the evaporation of the volatile solvent is applied through the walls of the evaporator. Thus, the temperature of the material being treated can be maintained at the desired temperature by controlling the temperature of the applied heat.

Both horizontally and vertically mounted thin film evaporators have been used successfully in the process of this invention. By horizontally mounted is meant that the axis of the tube and rotating wiper blades is horizontal. Likewise, in vertically mounted thin film evaporators the axis of the tubes and rotating wiper blades is vertical. This thin film evaporator apparatus has the advantage of being capable of operating in a manner in which the aqueous dispersion of microcapsules and liquid hot melt suspending medium can be continuously introduced either separately or as a premix ahead of the rotating wiper blades and withdrawing the dehydrated dispersion of microcapsules in the hot melt suspending medium at a point after passing through the rotating wiper blades of the evaporator. A significant advantage is that the dwell time of the mixture in the evaporator can be a matter of seconds which materially reduces the possibility of degradation and/or deterioration of the microcapsules. In practice the inlet and outlet ports may be located just within the rotating blade section of the tube. The particular construction of the evaporator is not asserted to be an inventive feature of this invention.

The dispersion of microcapsules in the hot melt suspending medium can be withdrawn from the evaporator either continuously or intermittently, as desired, using any convenient means of removal such as by pumping.

In the preferred form of this process, streams of the aqueous dispersion of microcapsules and the hot melt suspending medium are continuously introduced into a thin film evaporator at the beginning of the rotating blade section. The two streams are preferably introduced separately whereby the mixing is done by the rotating wiper blades. These blades may rotate at speeds of, for example, 600 to 1000 rpm. Turbulent, low shear agitation is maintained during the evaporation by the rotating wiper blades.

Throughout the preferred process of this invention the temperature is maintained about the melting point of the particular hot melt suspending medium otherwise the hot melt will solidify and not flow through the apparatus used in the process. The process temperature must also be maintained at a temperature above the boiling point of water at the vacuum conditions in the evaporator to provide quick evaporation of the water. Heating the hot melt suspending medium to a temperature above its melting point before mixing with the aqueous dispersion of microcapsules is essential. The aqueous dispersion of microcapsules is preferably added at room temperature or only slightly above. Maintaining too high a temperature can deteriorate and effectively prohibit the ability of the microcapsules to function properly. High temperatures cause the microcapsules to agglomerate and in some cases cause the microcapsule wall to swell to the point where they lose their contents by permeation or rupture. The temperature at which this deterioration occurs varies widely depending on the interaction of the particular wall-forming material used in making the microcapsules and the particular hot melt suspending medium.

Deterioration of the microcapsules is observed by taking a sample of the hot melt coating composition as it comes from the evaporator and determining the permeability of the microcapsules. A permeability of 5% is commercially acceptable.

Permeability as herein used is expressed as percent and is actually 100 times the ratio of the quantity of dye obtained by extraction of the capsules by the oil of the internal phase to the total quantity of dye obtained by this extraction plus that obtained by extraction of the microcapsules with a material which destroys the capsule wall. In each case, the color of the dye was developed by stannic chloride and the quantity of dye was determined spectrophotometrically.

In practice, the preferred wall temperature of the evaporator is as high as possible without degrading the microcapsules. Under this temperature condition both deterioration of the microcapsules and temporary solidification of the hot melt suspending medium which may appear as small particles due to cooling of the mixture by evaporation of the water is minimized.

The vacuum used in this operation is to reduce the boiling point thus permitting rapid removal of the volatile solvent by evaporation without prolonged exposure of the capsules to high temperatures particularly when in contact with water. Microcapsules tend to deteriorate rapidly with prolonged exposure to water at, say, 100° C. Using the wiped film evaporator, the dwell time of the microcapsules in contact with the hot water can be materially reduced being on the average only a few seconds before the water is evaporated. By metering the flow of the liquid hot melt suspending medium and the aqueous dispersion, the relative ratio of microcapsules to hot melt suspending medium in the resulting hot melt coating composition can be controlled as desired.

Mixing as applied to the process of this invention is of the low shear, turbulent type. The purpose of this turbulent mixing is to bring together in intimate contact the dispersion of the microcapsules in a volatile solvent and the hot melt suspending medium. Further, it prevents agglomeration of the microcapsules during the critical exchange of the continuous phase of the microcapsule dispersion for the continuous hot melt phase.

The following examples illustrate but do not limit the process of the invention. Example 1 illustrates a batch process. Examples 2 and 3 illustrate the preferred form of this process using thin film evaporators.

EXAMPLE 1

A 100 ml. resin kettle was fitted with a paddle stirrer and vacuum take-off and immersed in a hot water bath at 95°–98° C. Then 60 gm. each of an oxazoline wax (Oxawax TS-254AA obtained from IMC Chemical Group, Inc. Terre Haute, Indiana) and a deresinated oxidized montan wax (Hoechst "S" wax obtained from American Hoechst Corp., Chemicals and Plastics Div., Sommerville, New Jersey) were melted together and put in the kettle. The combined wax had a Fisher-Johns melting point of 61°–64° C. and a Brookfield viscosity at 95° C. of 62 centipoise using a No. 1 spindle at 60 rpm. To the melted wax, 210 gm. of a capsule emulsion containing 38% by weight isocyanate-polyol microcapsules were added slowly over a 15 minute period to prevent cooling and solidification of the wax. The microcapsules contained an oil solution of crystal violet lactone. A smooth, viscous, cream colored mixture resulted. Restricted water aspirator vacuum was immediately applied with stirring. Vacuum was regulated to cause rapid boiling without causing excessive foaming of the mass and to maintain the wax in a fluid state. After boiling subsided, full aspirator vacuum was applied, and some solidification of the composition on the stirrer occurred. When boiling was complete, a light tan colored, fluid hot melt coating composition had formed. The hot melt coating composition was coated on a 13.5 lb per 1300 square foot paper with a heated metal blade. The coat weight applied was about 1.3 lb per 1300 square foot of paper. Upon cooling, the coating hardened and had a waxy feel. When imaged against a paper coated with a phenolformaldehyde novolak resin clear, blue images were formed.

EXAMPLE 2

Equal parts of a deresinated oxidized montan wax (Hoechst "S" wax) and an oxazoline wax (Oxawax TS-254AA) were melted together and stored in a reservoir heated to 95° C. The combinated wax had a Fisher-Johns melting point of 61°–64° C. and a Brookfield viscosity at 95° C. of 62 centipoise using a No. 1 spindle at 60 rpm. An aqueous capsule dispersion containing 40%, by weight, hydroypropylcellulose microcapsules was prepared and stored in a second unheated reservoir.

The hydroxypropylcellulose capsules contained an oil solution of crystal violet lactone.

Both the melted wax and aqueous microcapsule dispersion were fed to a thin film evaporator using two Zenith metering pumps turned by the same gear drive. The pumps delivered the wax at 4.7 grams per minute and the capsule emulsion at 8.2 grams per minute. The two liquid streams were introduced into a steam jacketed, glass, wiped film evaporator (Scientific Glass and Instruments, Inc., Houston, Tex., Catalog No. 12000) at two separate locations just above the vertical wiper blades which rotate at 600 rpm. A temperature of about 100° C. was maintained on the evaporator walls by continuously passing steam at atmospheric pressure through the steam jacket. The pressure within the evaporator was maintained at an absolute pressure of 120 mm. Hg. Vigorous boiling was observed at the point where the streams entered the evaporator and the boiling became less vigorous as the mixture progressed down the evaporator walls. Boiling was almost completely absent where the hot light tan colored dry liquid left the evaporator. The liquid collected at the bottom of the evaporator had a Brookfield viscosity of 900 centipoise as measured at 90° C. with the No. 3 spindle at 60 rpm. The microcapsules appeared to be well dispersed and the dispersion was smooth and free of lumps. The permeability of the microcapsules in the dispersion was less than 3%.

A 1.3 lb. per 1300 square foot coating of the hot melt product was applied to a 13.5 lb. per 1300 square foot bond paper using a hot metal blade. The cooled, set coating had a slightly waxy feel. When pressure imaged against a novolak resin coated record sheet, a clear, blue, well defined image resulted.

EXAMPLE 3

Carnauba wax (No. 3 N.C. Light refined, Dura Commodities Corp., Harrison, N.Y.) was melted and stored in a reservoir heated to 95° C. The wax had a Fisher-Johns melting point of 81°-84° C. and a Brookfield viscosity at 95° C. of 25 centipoise using a No. 1 spindle at 60 rpm. An aqueous capsule dispersion containing 40%, by weight, HPC microcapsules and 3%, by dry weight based on the dry weight of the microcapsules, of a dispersing agent, Tamol 731, (Rohm and Haas Company, Philadelphia, Pa.) was prepared and stored in a second unheated reservoir. The HPC capsules contained an oil solution of crystal violet lactone.

Both the melted wax and aqueous microcapsule dispersion were fed to a thin film evaporator using two Zenith metering pumps turned by the same gear drive. The pumps delivered the wax at about 37 grams per minute and the capsule emulsion at about 65 grams per minute. The two liquid streams were introduced into a steam jacketed, horizontally mounted thin film evaporator (one square foot Rototherm "V", model (DB) Artisan Industries, Waltham, Mass.) at two separate locations just within the wiped area. The horizontal wiper blades rotated at 1000 rpm. and were mounted with 30 thousandth inch clearance from the evaporator walls. A temperature of about 105° C. was maintained on the evaporator walls by maintaining steam at 3 psi gauge pressure in the steam jacket. The pressure within the evaporator was maintained at an absolute pressure of 25 mm. Hg. Boiling was almost completely absent where the hot tan colored dry liquid left the evaporator. The liquid collected at the bottom of the evaporator had a Brookfield viscosity of about 400 centipoise as measured at 90° C. with the No. 3 spindle at 60 rpm. The hot melt coating composition contained about 31% microcapsules. As viewed on a hot glass slide under a microscope the microcapsules appeared to be well dispersed having a dispersion characteristic rating of 9 or better. No evidence of rupture of the microcapsules was observed.

A 1.3 lb. per 1300 square foot coating of the hot melt product was applied to a 13.5 lb. per 1300 square foot bond paper using a hot metal blade. The cooled, set coating had a slightly waxy feel. When pressure imaged against a novolak resin coated record sheet, a clear, well defined image resulted.

EXAMPLE 4

To 8 parts of a 50% water slurry of titanium dioxide, 30 parts of 90% arrow root starch particles, and 63 parts of a 40% HPC capsule (containing an oil solution of color precursor) aqueous slurry, 56 parts of Carbowax 4000 were added with stirring by paddle stirrer in a 1000 ml. resin kettle fitted with water aspirator take-off. At room temperature, most of the Carbowax particles dissolved in the water of the capsule slurry. A 75° C. hot water bath was applied to the resin kettle, and the remaining Carbowax dissolved as the temperature of the mass in the resin kettle reached 50° C. Water aspirator vacuum of about 90 mm. Hg absolute pressure was applied with continued stirring, causing rapid boiling. After about two hours, boiling nearly ceased. The microcapsules appeared to be well dispersed and the dispersion was smooth and free of lumps. The viscosity as measured by a Brookfield viscometer at 100 rpm with a No. 7 spindle was 7800 centipose at 68° C.

The dispersion was coated by a hot blade drawdown on a sheet of 13.5 pounds per 1300 square foot bond paper. The cooled, set coating had a waxy feel. When pressure imaged against a phenolformaldehyde novolak resin coated record sheet, a clear, well defined image resulted.

EXAMPLE 5

A mixture of 62.5 parts of a 40% HPC capsule slurry, 6 parts of a 50% aqueous dispersion of titanium dioxide, and 11.1 parts of 90% Arrowroot starch was stirred together in a 5000 ml. resin kettle by a paddle stirrer. In a beaker, 44 parts of Carbowax 5000, 6 parts of Bakelite AyAc (a polyvinyl acetate, Union Carbide Corporation New York, NY), and 12 parts of Arochem 650 (a polyester resin, Ashland Chemicals, Columbus, Ohio) were heated to 120° C. on a hot plate and stirred with a propeller stirrer. When all materials had melted and the mixture was homogeneous, it was allowed to cool to 95° C. and added to the mixture in the resin kettle with stirring. The Arochem was caused to precipitate. A white viscous slurry resulted. Heat was applied by an electric heating mantle and water aspirator vacuum of about 25 mm. Hg absolute pressure caused rapid boiling until almost all the water was removed. A temperature of about 65° C. was maintained in the kettle during rapid boiling. When the temperature rose to 95° C., water removal was substantially complete. After 0.5 hours more, the mixture was smooth and uniform and appeared to be free of lumps. The viscosity as measured by a Brookfield viscometer at 60 rpm. with a No. 4 spindle was 10,000 centipose at 92° C. The coating was applied to a paper substrate and imaged as in example 4.

What is claimed is:

1. A process for the preparation of a hot melt coating composition for use in the manufacture of carbonless paper, said coating composition being capable of being set to a solid without the application of heat, said hot melt coating composition containing microcapsules comprising the steps of:
   (a) preparing a dispersion of substantially discrete microcapsules in a volatile solvent continuous phase said microcapsules containing an oily solution of a chromogenic material, said microcapsules being substantially oil and water impermeable;
   (b) preparing a hot melt suspending medium, said hot melt suspending medium having a melting point of from about 50° C. to about 140° C. and a melting range of less than about 15° C., said hot melt suspending medium being in a fluid state;
   (c) mixing together with turbulent agitation said dispersion of substantially discrete microcapsules in a volatile solvent continuous phase and said hot melt suspending medium;
   (d) applying heat and a vacuum to said mixture, while maintaining said agitation, until said volatile solvent is substantially removed from said mixture to form a dispersion of substantially discrete microcapsules in said hot melt suspending medium, said heat being applied at a rate sufficient to maintain said mixture at a temperature above the melting point of said hot melt suspending medium, said temperature also being above the boiling point of water at said vacuum.

2. A process for the preparation of a hot melt coating composition for use in the manufacture of carbonless paper, said coating composition being capable of being set to a solid without the application of heat, said hot melt coating composition containing microcapsules comprising the steps of:
   (a) preparing a dispersion of substantially discrete microcapsules in a volatile solvent continuous phase said microcapsules containing an oily solution of a chromogenic material, said microcapsules being substantially oil and water impermeable;
   (b) preparing a hot melt suspending medium, said hot melt suspending medium having a melting point of from about 50° C. to about 140° C. and a melting range of less than about 15° C.;
   (c) heating said hot melt suspending medium to a temperature above the melting point of said hot melt suspending medium to form a liquid hot melt suspending medium;
   (d) mixing together with turbulent agitation said dispersion of substantially discrete microcapsules in a volatile solvent continuous phase and said liquid hot melt suspending medium to form an intimate mixture of said dispersion of microcapsules and said hot melt suspending medium;
   (e) applying a vacuum to said mixture, while maintaining said agitation and said temperature, until said volatile solvent is substantially removed from said mixture to form a dispersion of substantially discrete microcapsules in said liquid hot melt suspending medium, said temperature being above the boiling point of water at said vacuum level.

3. The process of claim 2 wherein said hot melt suspending medium is characterized by the presence of one or more functional groups selected from the groups consisting of: carboxyl, carbonyl, hydroxyl, ether, methoxy, ethoxy, ester, amide, amine, heterocyclic groups and combinations thereof to impart polarity thereto.

4. The process of claim 2 wherein said volatile solvent is water.

5. The process of claim 4 wherein said hot melt suspending medium is water insoluble.

6. The process of claim 4 wherein said hot melt suspending medium is water soluble.

7. The process of claim 2 wherein said mixture contains a dispersing agent.

8. The process of claim 2 wherein metered quantities of said dispersion of microcapsules and said liquid hot melt suspending medium are continuously added with mixing to an evaporator provided with a source of heat, vacuum and continuous turbulent agitation and said mixture with substantially all of the volatile solvent removed is continuously withdrawn from said evaporator.

9. The process of claim 8 wherein said mixing of said dispersion of microcapsules and said liquid hot melt suspending medium occurs within said evaporator.

10. The process of claim 2 wherein said microcapsules contain a chromogenic material.

11. The process of claim 2 wherein said microcapsules are prepared by encapsulating an oil solution of a chromogenic material in a wall forming compound selected from the group consisting of hydroxypropylcellulose, carboxymethylcellulose, gelatin, melamine-formaldehyde, polyfunctional isocyanates and prepolymers thereof, polyfunctional acid chlorides, polyamines, polyols, epoxides and mixtures thereof.

12. The process of claim 6 wherein said step of mixing together with agitation said aqueous dispersion of substantially discrete microcapsules and said liquid hot melt suspending medium comprises dissolving said liquid water soluble hot melt suspending medium in said aqueous continuous phase of said aqueous dispersion of microcapsules, said dissolving resulting in the formation of a homogeneous mixture.

13. A process for the continuous preparation of a hot melt coating composition for use in the manufacture of carbonless paper, said coating composition being capable of being set to a solid without the application of heat, said hot melt coating composition containing microcapsules comprising the steps of:
   (a) preparing a dispersion of substantially discrete microcapsules in an aqueous continuous phase said microcapsules containing an oily solution of a chromogenic material, said microcapsules being substantially oil and water impermeable;
   (b) preparing a water insoluble hot melt suspending medium, said hot melt suspending medium having a melting point of from about 50° C. to about 140° C. and a melting range of less than about 15° C.; said hot melt suspending medium being characterized by the presence of one or more functional groups selected from the group consisting of: carboxyl, carbonyl, hydroxyl, ether, methoxy, ethoxy, ester, amide, amine, heterocyclic group and combinations thereof to impart polarity thereto;
   (c) heating said water insoluble hot melt suspending medium to a temperature above the melting point of said hot melt suspending medium to form a liquid hot melt suspending medium;
   (d) mixing together with turbulent agitation said aqueous dispersion of substantially discrete microcapsules and said liquid hot melt suspending medium to form an intimate mixture of said aqueous dispersion and said liquid hot melt suspending medium;

(b) preparing a hot melt suspending medium, said hot melt suspending medium having a melting point of from about 50° C. to about 140° C. and a melting range of less than about 15° C.;

(c) heating said hot melt suspending medium to a temperature above the melting point of said hot melt suspending medium to form a liquid hot melt suspending medium;

(d) mixing together with turbulent agitation said dispersion of substantially discrete microcapsules in a volatile solvent continuous phase and said liquid hot melt suspending medium to form an intimate mixture of said dispersion of microcapsules and said hot melt suspending medium;

(e) applying a vacuum to said mixture, while maintaining said agitation and said temperature, until said volatile solvent is substantially removed from said mixture to form a dispersion of substantially discrete microcapsules in said liquid hot melt suspending medium, said temperature being above the boiling point of water at said vacuum level.

14. The process of claim 13 wherein said mixture additionally contains a dispersing agent.

15. A process for the continuous preparation of a hot melt coating composition for use in the manufacture of carbonless paper, said coating composition being capable of being set to a solid without the application of heat, said hot melt coating composition containing microcapsules comprising the steps of:

(a) preparing a dispersion of substantially discrete microcapsules in an aqueous continuous phase said microcapsules containing an oily solution of a chromogenic material, said microcapsules being substantially oil and water impermeable;

(b) preparing a water-soluble hot melt suspending medium, said hot melt suspending medium having a melting point of from about 50° C. to about 140° C. and a melting range of less than about 15° C.; said hot melt suspending medium being characterized by the presence of one or more functional groups selected from the group consisting of: carboxyl, carbonyl, hydroxyl, ether, methoxy, ethoxy, ester, amide, amine, heterocyclic groups and combinations thereof to impart polarity thereto;

(c) heating said water soluble hot melt suspending medium to a temperature above the melting point of said hot melt suspending medium to form a liquid water soluble hot melt suspending medium;

(d) mixing together with turbulent agitation said aqueous dispersion of substantially discrete microcapsules and said liquid water soluble hot melt suspending medium until said liquid water soluble hot melt suspending medium has dissolved into said aqueous continuous phase of said dispersion of microcapsules, said dissolving resulting in the formation of a mixture; and (e) applying a vacuum to said mixture, while maintaining said turbulent agitation and said temperature, until water is substantially removed from said mixture to form a dispersion of said substantially discrete microcapsules in said liquid water soluble hot melt suspending medium, whereby said agitation, said temperature and said vacuum are sufficiently low to prevent substantial deterioration of said microcapsules, said temperature being above the boiling point of water at said vacuum level.

16. The process of claim 15 wherein said mixture additionally contains a dispersing agent.

* * * * *